United States Patent [19]
Kienitz et al.

[11] Patent Number: 5,640,015
[45] Date of Patent: Jun. 17, 1997

[54] PYROMETER ELECTROMAGNETIC RADIATION MEASURING DEVICE

[75] Inventors: Ulrich Kienitz; Thomas Heinke; Uwe Klonowski; Peter Preuss; Holger Sandring; Volker Schmidt, all of Berlin, Germany

[73] Assignee: Raytek Sensorik GmbH, Berlin, Germany

[21] Appl. No.: 546,988

[22] Filed: Oct. 23, 1995

Related U.S. Application Data

[63] Continuation of Ser. No. 206,979, Mar. 4, 1994, abandoned.

[30] Foreign Application Priority Data

Mar. 25, 1993 [DE] Germany ............ 43 09 762.6

[51] Int. Cl.$^6$ ........................................ G01J 5/06
[52] U.S. Cl. .................. 250/349; 250/351; 374/126; 374/129
[58] Field of Search ............... 250/349, 352, 250/351, 233; 374/126, 129

[56] References Cited

U.S. PATENT DOCUMENTS

| | | | |
|---|---|---|---|
| 2,920,485 | 1/1960 | Derganc | 374/129 |
| 4,831,258 | 5/1989 | Paulk et al. | 250/349 |
| 4,883,364 | 11/1989 | Astheimer | 374/129 |
| 5,046,858 | 9/1991 | Tucker | 374/129 |

*Primary Examiner*—Carolyn E. Fields
*Attorney, Agent, or Firm*—Learman & McCulloch

[57] ABSTRACT

A pyrometer for measuring the electromagnetic radiation emitted by an object comprises a first detector to which the radiation is delivered through an optical system as well as a second detector to which the radiation emanating from a reference element is delivered through the same optical system. The temperature of the reference element is monitored and a rotary optical modulator periodically enables and disables the delivery of radiation to the detectors. The output signals from the two detectors are processed to determine the difference therebetween. The sensed temperature of the reference element is taken into account as a part of determining the difference between the two detector output signals. In this way it is possible for the characteristic radiation of the optical system largely to be suppressed. The optical modulator comprises a semi-circular disk having a polyethylene terephthalate substrate coated on each side with metal. The disk is rotated through 180° increments by a stepping motor such that, in one angular position, the disk permits reception by the two detectors of radiation from the optical system and, in the other angular position, the disk prevents reception by the detectors of radiation from the optical system.

11 Claims, 3 Drawing Sheets

PYROMETER ELECTROMAGNETIC RADIATION MEASURING DEVICE

This is a continuation of application Ser. No. 08/206,979, filed on Mar. 4, 1994, now abandoned.

The invention relates to temperature measuring devices, such as pyrometers, that measure electromagnetic radiation emitted from an object.

BACKGROUND OF THE INVENTION

Pyrometers are known in the art which contain a single-element detector to which the thermal radiation emitted by an object is delivered by means of an optical system. However, in this case the problem occurs that the characteristic thermal radiation of the optical system also enters into the output signal of the detector. In order to reduce the characteristic radiation of the imaging optical system, the use of high-grade, slightly absorbent materials is proposed in refractive optical systems and the use of very reflective surfaces is proposed in reflective optical systems.

Another possibility known in the art resides in the electronic compensation of the signal when the temperature of the optical system is known. For this purpose, in a pyrometer a second detector is provided which is covered by a reference element disposed immediately in front of it, so that the reference radiation emanating therefrom falls onto the second detector. By means of a correspondingly arranged temperature sensor the temperature can be determined in the measuring device and can then be taken into account in the processing of the output signals of the two detectors in a corresponding device.

However, this electronic compensation is not suitable in the case of an irregular temperature distribution within the optical system, such as occurs for example in the case of abrupt changes in the ambient temperature. Such temperature changes can occur for example due to the device being picked up in the hand.

SUMMARY OF THE INVENTION

The principal object of the invention is to provide an electromagnetic radiation measuring device such as a pyrometer in which, even in the event of abrupt changes in the ambient temperature, the characteristic radiation of the optical system is effectively compensated.

This object is achieved according to the invention by the provision of a reference element in such a way that the reference radiation emanating therefrom is passed through the optical system to the second detector. The temperature of the reference element is monitored. As a result, after the formation of the difference of the output signals of the two detectors the component of the characteristic radiation of the optical system is excluded, so that a measurement signal is obtained which is independent of the temperature of the optical system.

According to the invention it is possible to use both detectors which are sensitive to constant light and detectors which are sensitive to alternating light.

DETAILED DESCRIPTION

Figure 1:
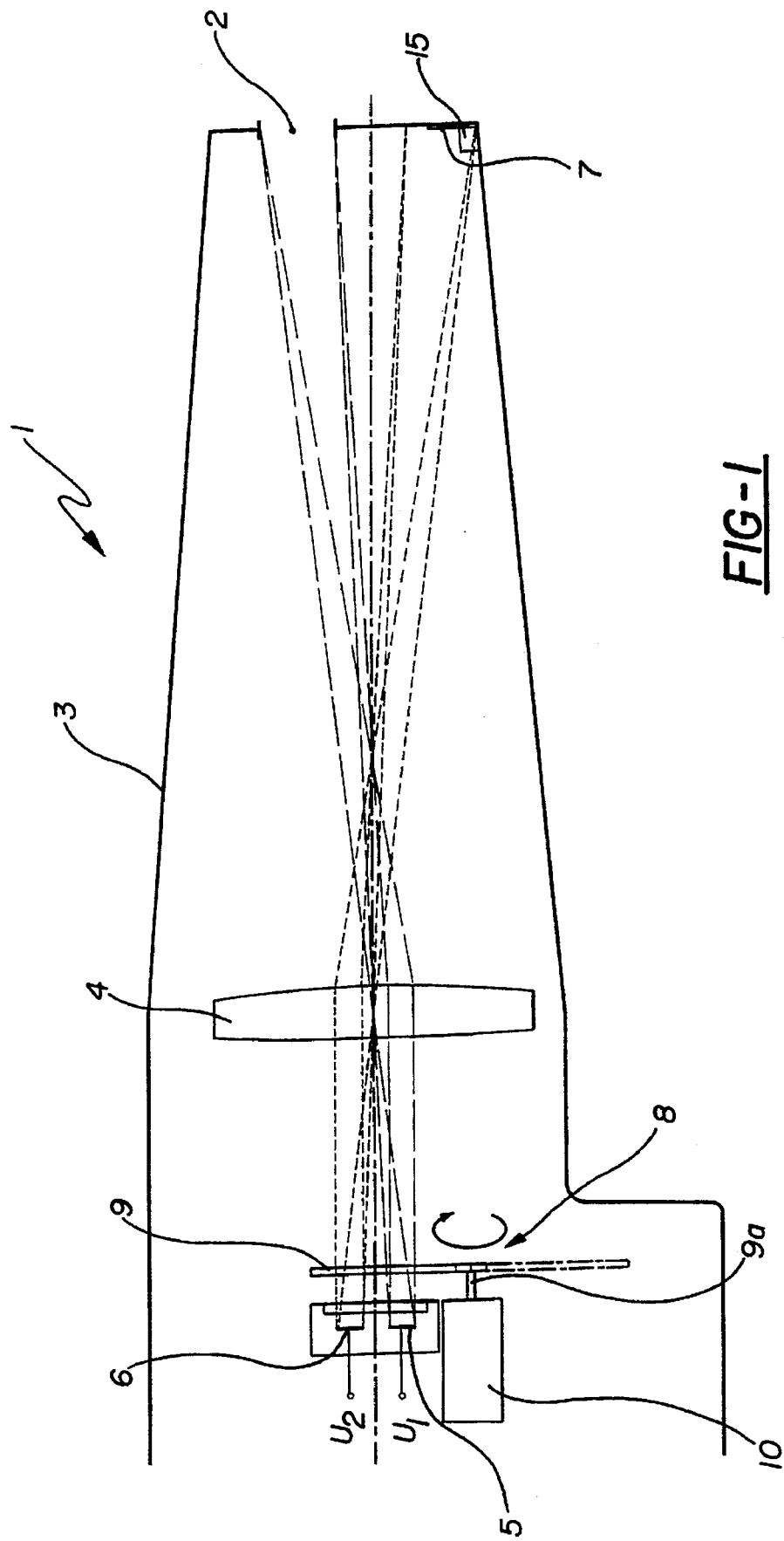
FIG. 1 is a diagrammatic view of a first embodiment of a measuring device.

The measuring device 1 shown in FIG. 1 consists essentially of a housing 3 having an inlet opening 2, an optical system 4, a first detector 5, a second detector 6 and a reference element 7.

Both detectors which are sensitive to constant light and detectors which are sensitive to alternating light can be used for the detectors 5, 6. In the first embodiment according to FIG. 1 detectors which are sensitive to alternating light are provided. This in turn requires an optical modulator 8, forming a part of the optical system, to be introduced periodically into the beam path between the inlet opening 2 and the two detectors 5, 6. According to the present invention the modulator is advantageously disposed between the optical system 4 and the two detectors 5, 6. For the more detailed construction of the modulator 8 reference is made to the explanations relating to FIG. 3.

The optical system 4 which is shown in simplified form in FIG. 1 on the one hand images the inlet opening 2 onto the detector surface of the first detector 5 and on the other hand images the reference element onto the detector surface of the second detector 6. If the measuring device 1 with its inlet opening 2 is aligned with an object to be measured, the following output signals are produced on the two detectors 5, 6:

$$U_1 = S_1 * \langle I_{Obj} + I_{Opt} - I_{Mod} \rangle$$

$$U_2 = S_2 * \langle I_{Ref} + I_{Opt} - I_{Mod} \rangle$$

where:

$U_1$: electrical output signal from the first detector 5;
$U_2$: electrical output signal from the second detector 6;
$S_1$: radiation sensitivity of the first detector 5;
$S_2$: radiation sensitivity of the second detector 6;
$I_{Obj}$: radiation intensity of the electromagnetic radiation emitted by the object and incident in the measuring device through the inlet opening 2;
$I_{Ref}$: intensity of the characteristic radiation of the reference element 7;
$I_{Opt}$: intensity of the characteristic radiation of the optical system 4;
$I_{Mod}$: intensity of the characteristic radiation of the optical modulator 8.

The two output signals $U_1$, $U_2$ of the two detectors 5, 6 are delivered to a device which is not shown in greater detail in FIG. 1 and which processes the two signals by difference formation.

In processing of the two output signals the known temperature of the reference element 7 is measured and taken into account. This temperature can be determined by any suitable device 15 connected to the reference element.

On the assumption that the radiation sensitivities $S_1$, $S_2$ of the two detectors 5, 6 are the same, the formation of the difference of the two output signals gives:

$$U_{Meβ} = U_1 - U_2 = S * \langle I_{Obj} - I_{Ref} \rangle$$

where
$S = S_1 = S_2$

Thus the measurement signal $U_{Meβ}$ determined in this way is independent of the characteristic radiation of the optical system 4 and the characteristic radiation of the modulator 8. This means that the temperatures of the optical system 4, the modulator 8 and the reference element 7 can differ without resulting in an influence on the measurement signal. Therefore the measuring device enables a reliable radiation measurement even when there is an irregular temperature distribution in the measuring device 1, such as occurs for example in the case of abrupt changes of the ambient temperature.

The tests on which the invention is based have shown that the measuring errors which result from an abrupt change in the ambient temperature are at about 10K without the compensation according to the invention. With a measuring device according to the invention there only remains a residual error of approximately 1.5K. This residual error is caused in particular by the differing radiation sensitivities of the two detectors 5, 6.

This residual error can be further reduced for example by detectors which are electronically co-ordinated with one another.

A further reduction in the residual error can be achieved in that the thermal time constant of the modulator 8 is adapted to that of the optical system in the best possible way.

Figure 3:
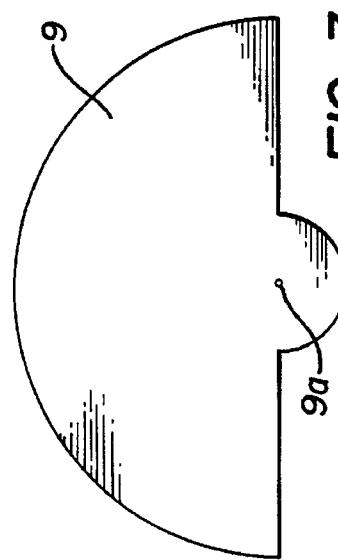
FIG. 3 is a front elevational view of a modulator.

The optical modulator 8 consists essentially of a semi-circular modulator disc 9 which is shown in FIG. 3 and is rotated about an axis 9a by a miniature rotary stepping motor 10. This stepping motor 10 is disposed in the immediate proximity of the two detectors 5, 6 in such a way that it covers the two detectors in one position with the modulator disc 9 covers the two detectors in one position of the disc which forms the region which is impermeable to radiation. Thus in this position no radiation can reach the two detectors 5, 6 through the optical system 4. With a rotation of the disc 9 through about 180° the radiation-permeable region of the modulator 8 comes into the beam path. This region is produced in a simple manner in that the modulator disc 9 is constructed merely as a semi-circular disc.

In order to be able to dispense with a position recognition system for the modulator disc 9, the stepping motor 10 preferably has two position in one of which the disc forms the radiation-impermeable region and in the other position of which the radiation-permeable region is located in the beam path between the optical system and the two detectors 5, 6. These two alternate positions can be repeatedly produced, since the direction of current through the motor winding defines the two angular positions of the modulator 8.

A further advantage of such miniature rotary stepping motors 10 resides in the very low energy consumption. However, this also means that a modulator disc 9 must be used which is distinguished by a very light weight.

This is achieved by using for the modulator disc 9 a substrate of polyethylene terephthalate which is coated with a metal material both on the side facing the radiation and on the side facing away from the radiation. This modulator disc 9 is distinguished on the one hand by its light weight and on the other hand by sufficient rigidity at different temperatures and air humidity levels. Furthermore, the modulator disc 9 is impermeable to electromagnetic radiation, particularly in the infrared range.

The metal coating also ensures a good thermal conductivity, so that the thermal time constant of the modulator disc 9 can be markedly reduced with respect to conventional modulator discs and adapted to the thermal time constant of the optical system 4. In this way the residual error caused by differing sensitivities of the two detectors is further reduced when the ambient temperature changes abruptly.

However, the shape of the modulator disc 9 shown in FIG. 3, can also be varied in a suitable manner, for example by forming it of quadrant segments arranged so that they lie opposite one another.

Figure 2:
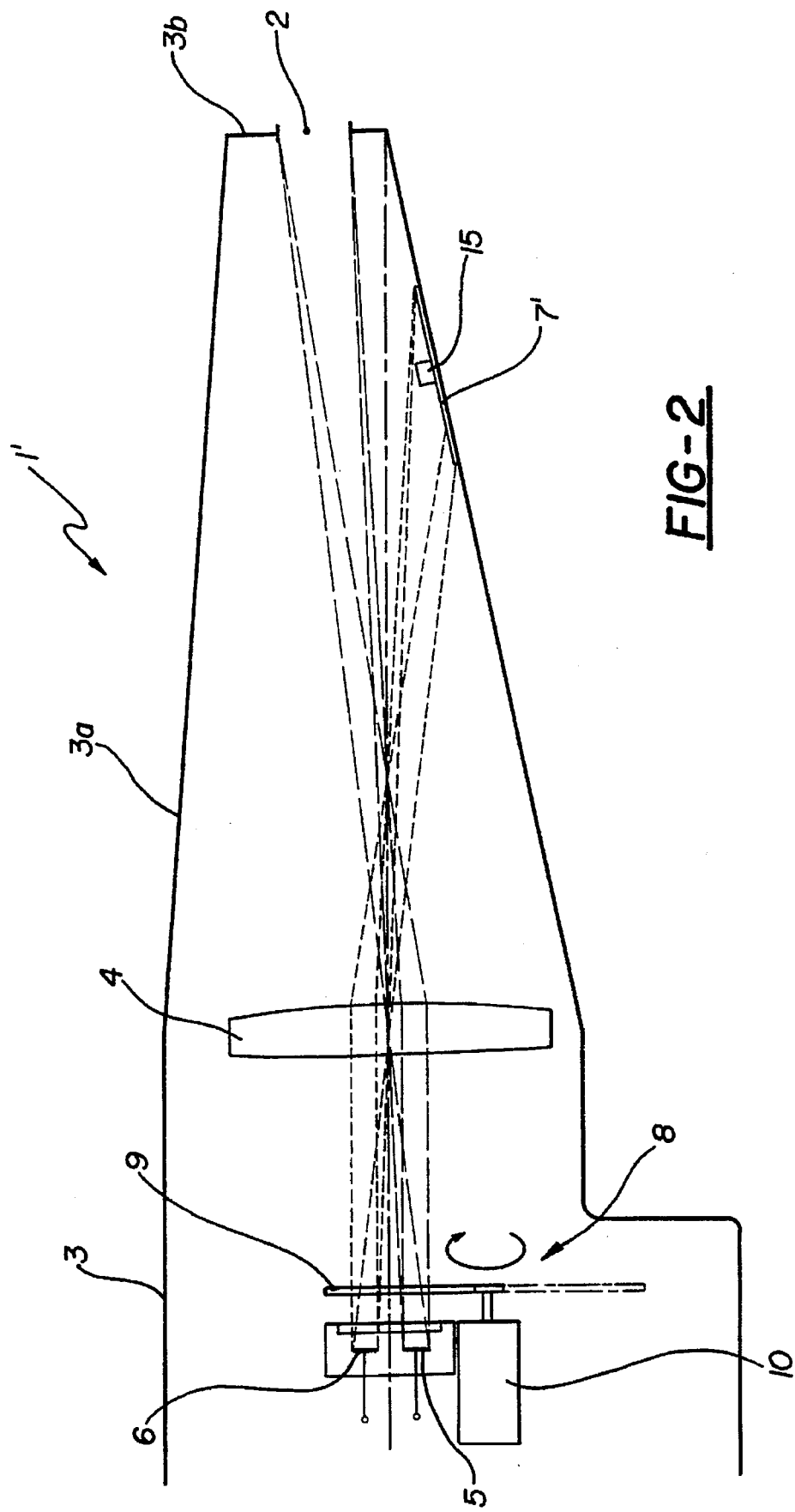
FIG. 2 is a view similar to FIG. 1 but showing a second embodiment of the measuring device.

A second embodiment of a measuring device 16 is shown in FIG. 2. It has substantially the same construction as the first embodiment according to FIG. 1, so that the same reference numerals are used for the same parts.

There is a substantial difference in the arrangement of the reference element 7'. In this case the surface to be imaged by the reference element is no longer parallel to the detector surface of the second detector 6, but instead is inclined thereto. This results in an indistinct projection of the reference surface onto the detector surface, which is compensated, however, by a correspondingly larger reference surface.

The reference element 7' is preferably disposed on the inside of the housing 3 in the region of the inlet opening 2. As a result the housing 3 can be conically tapered in its front region 3a, In this way the front face 3b of the housing 3 containing the inlet opening is relatively small. This in turn facilitates a relatively good and accurate alignment of the measuring device on an object to be examined. The measuring device 1 is therefore particularly suitable for temperature measurement in components on circuit boards.

However, in principle measurements of other electromagnetic radiations are possible with the measuring devices 1, 1'. With corresponding calibration of the measuring device the quantity of heat given off by an object could for example be determined.

Within the scope of the invention the first and second detectors can also be formed by a plurality of detectors. As a result, a reduction in noise could be achieved by corresponding correlation calculations.

In many applications it is desirable for the analogue measurement signal to be further processed in a computer. For this purpose the analogue measurement signal must first of all by converted by an analogue/digital converter into a digital signal. If the measurement signal prepared by the computer is required again in analogue form, then a renewed conversion is carried out by a digital/analogue converter.

Precision circuit arrangements are known in the art by means of which both functions can be carried out. In order to obtain the corresponding digital signal from an analogue signal a digital/analogue converter is used in such a way that the output voltage thereof is altered by successive approximation until it deviates from the analogue signal less than one quantisation step. The digital signal determined in this way can then be prepared by computer.

If the digital signal prepared by computer is to be converted again into an analogue signal it is used as the input value of the digital/analogue converter.

For this purpose R-2R resistance networks in inverse operation, which can be produced relatively simply in circuitry terms, with a connected current/voltage converter are generally used as digital/analogue converters. Electronically controlled CMOS switches are usually used as switches for the individual switching stages.

Figure 4:
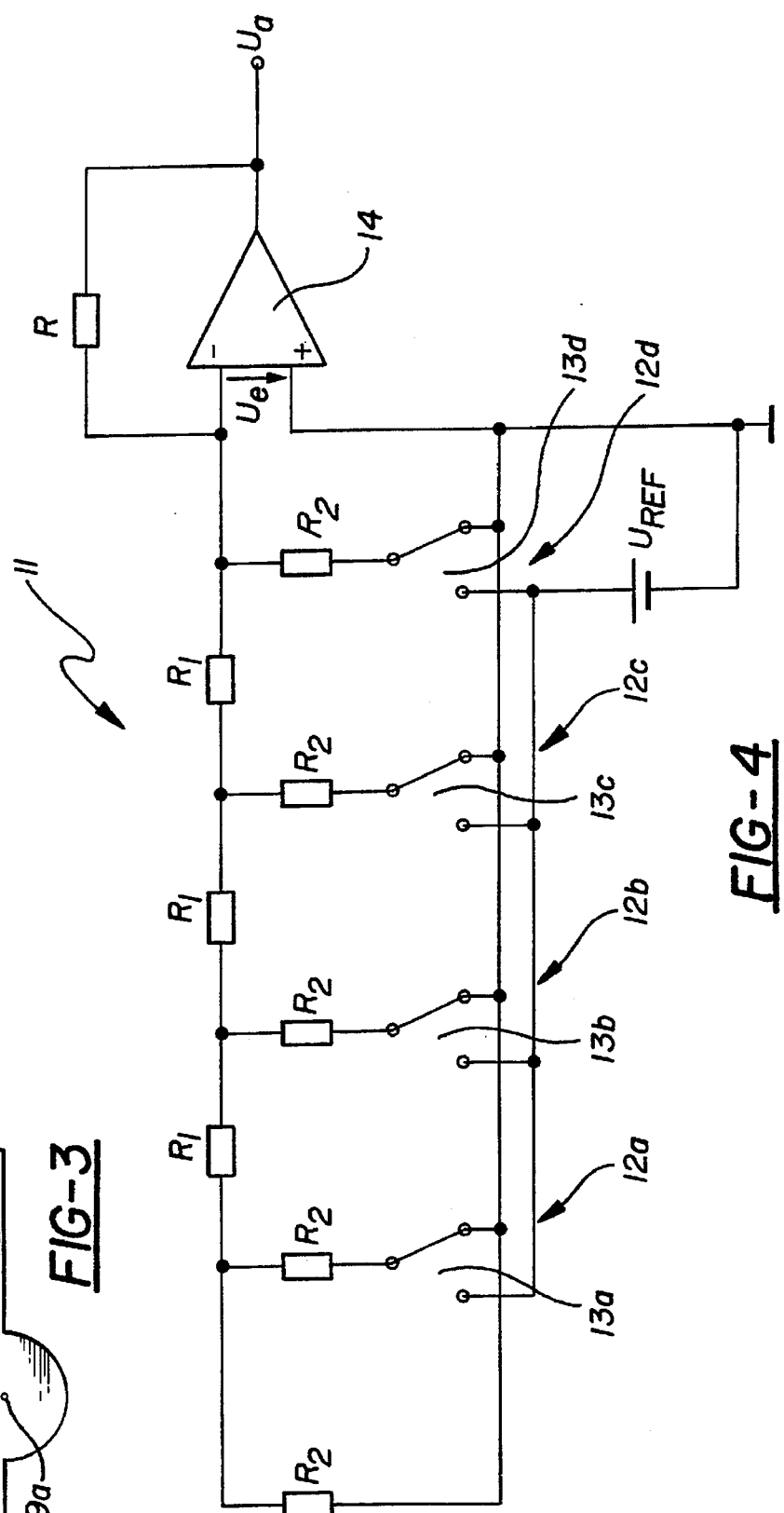
FIG. 4 is a schematic diagram of a digital/analogue converter.

A digital/analogue converter 11 of the aforementioned type with four switching stages 12a, 12b, 12c and 12d is shown in FIG. 4. The individual switching stages each essentially contain a switch 13a to 13d and at least one resistance $R_1$, $R_2$.

The resistances $R_1$ and $R_2$ used in the circuit arrangement according to FIG. 4 satisfy the condition:

$R_2 = 2\,R_1$

As a result the weight of the individual switching stages 12a to 12d increases from left to right in the ratio 1:2:4:8. Therefore with the switches 13a to 13d, 16 different stages are possible in the range from 0 to 15 times the smallest quantisation step.

At a specific position of the switches 13a to 13d a corresponding total resistance is produced, so that by way of a reference voltage source with a voltage $U_{Ref}$ a corresponding input voltage $U_e$ is set on a current/voltage converter 14. This in turn produces an output voltage $U_a$ which corresponds to the input voltage and which as an analogue voltage corresponds to the digital signal produced by the switches 13a to 13d.

In theory such a circuit arrangement can be extended in any way. Apart from a precise reference voltage source it requires above all resistances which exactly satisfy the condition $R_2=2 R_1$.

In the use of a digital/analogue converter in connection with the measuring device described above, 12 switching stages will for example be required in order to be able to operate in a corresponding class of accuracy.

In this case the problem arises that the converter with individual resistances in the usual commercial classes of tolerance cannot be produced with the desired precision. Therefore integrated networks are generally used which undergo cost-intensive laser balancing.

If a computer is available with sufficient reserve regarding computing time and storage space and if a specimen-dependent calibration of instruments is to be carried out in any case, it is obvious to determine and store the exact weights of the individual switching stages and to include these in the error correction calculation in subsequent analogue/digital and digital/analogue conversions.

However, it has been found in this case that so-called bit errors can nevertheless occur in the converter characteristic if the weight of one switching stage lies more than one quantisation step above the sum of the weights of all stages of lower weight. As a result, on the one hand some analogue values cannot be produced at all in this case and on the other hand at different switch positions analogue values are produced which differ from one another by less than one quantisation step.

The digital/analogue converter described above has been further developed so that the above-mentioned disadvantages are avoided.

This is achieved in that the ratio of the weights of adjacent switching stages is less than 1:2.

Thus for a specific quantisation range more switching stages are required, since several analogue values which differ from one another by less than one quantisation step determined by the smallest weight can be generated with different switch positions. However, with suitable adaptation of the weight ratios of adjacent switch stages to the maximum tolerances of the resistances the aforementioned gap in the converter characteristic can be avoided.

Such a digital/analogue converter corresponds to the construction shown in FIG. 4, where according to the required accuracy further switch stages can be provided. If for example it is operated with 16 switching stages and resistances are used which show a deviation of 5% from the nominal value, the above-mentioned disadvantages can be avoided if the resistances satisfy the following condition:

$R_1/R_2=2.7/1$

Although this digital/analogue converter is suitable for use with the measuring device 1, 1', use thereof independently of the measuring device is conceivable.

We claim:

1. Apparatus for measuring electromagnetic radiation emitted by an object comprising a first detector for sensing radiation emitted by said object and generating a first output signal; a reference element from which emanates reference radiation; a second detector for sensing said radiation from said reference element and generating a second output signal; an optical system for transmitting radiation along a first path from said object to said first detector and for transmitting radiation along a second path from said reference element to said second detector; means for sensing the temperature of said reference element; and means for processing the first and second output signals by determining their difference and taking into account the temperature of the reference element.

2. Apparatus according to claim 1 including a housing within which said reference element is positioned.

3. Apparatus according to claim 1 including means for alternately enabling and disabling the reception by said first and second detectors of radiation propagated along said first and second paths, respectively.

4. Apparatus according to claim 3 wherein said enabling and disabling means comprises a movable optical modulator having at least two regions one of which is radiation permeable and the other of which is radiation impermeable, and drive means coupled to said modulator for alternately positioning said regions in the paths of transmissions of the respective radiations.

5. Apparatus according to claim 1 wherein said reference element is substantially parallel to said second detector.

6. Apparatus according to claim 1 wherein said reference element is inclined to said second detector.

7. Apparatus according to claim 1 wherein said means for processing comprises a digital/analogue converter.

8. The apparatus according to claim 1 wherein said converter includes a reference source, a plurality of adjacent switching stages each of which has at least one resistor and a switch, and a current/voltage convertor for providing an output signal.

9. Apparatus according to claim 8 wherein each successive switching stage has an associated weight that is less than or equal to twice the weight of the previous switching stage.

10. Apparatus for measuring electromagnetic radiation emitted by an object comprising a first detector for sensing radiation emitted by said object and generating a first output signal; a reference element from which emanates reference radiation; a second detector for sensing said radiation from said reference element and generating a second output signal; an optical system for transmitting radiation along a first path from said object to said first detector and for transmitting radiation along a second path from said reference element to said second detector; means for sensing the temperature of said reference element; means for receiving the first and second output signals and determining their difference; and means for alternately enabling and disabling the reception by said first and second detectors of radiation propagated along said first and second paths, respectively, wherein said enabling and disabling means comprises a movable optical modulator having at least two regions one of which is radiation permeable and the other of which is radiation impermeable; drive means coupled to said modulator for alternately positioning said regions in the paths of transmissions of the respective radiations; and wherein said modulator has a substrate of polyethylene terephthalate coated with metal on that side which faces the respective radiations and on that side which faces away from the respective radiations.

11. Apparatus according to claim 4 wherein said drive means comprises a stepping motor.

* * * * *